April 5, 1966 A. F. W. STECKER 3,244,200
PITCH SPINDLE FOR WINDING APPARATUS
Filed Oct. 18, 1963

INVENTOR.
ALBERT F. W. STECKER
BY
AGENT

April 5, 1966          A. F. W. STECKER          3,244,200

PITCH SPINDLE FOR WINDING APPARATUS

Filed Oct. 18, 1963          2 Sheets-Sheet 2

INVENTOR.
ALBERT F. W. STECKER
BY

AGENT

United States Patent Office 3,244,200
Patented Apr. 5, 1966

3,244,200
PITCH SPINDLE FOR WINDING APPARATUS
Albert Fritz Wilhelm Stecker, Hamburg-Lokstedt, Germany, assignor to North American Philips Company, Inc., New York, N.Y., a corporation of Delaware
Filed Oct. 18, 1963, Ser. No. 317,318
Claims priority, application Germany, Oct. 20, 1962, P 30,412
4 Claims. (Cl. 140—71.5)

The invention relates to a method of manufacturing a pitch spindle for apparatus for winding grids, in particular frame grids.

The pitch of successive grid turns produced in the known winding apparatus becomes less uniform as the distances between the turns and the diameter of the grid wire becomes smaller. While the accuracy of winding is improved by using a winding wire with an extremely smooth surface and a minimum of variations in the wire diameter such wire is very expensive.

In addition, the known pitch spindles used in grid winding devices do not provide a uniform notched helical guide groove or a true profile, since the cutter used for notching the groove is rapidly worn and after a few rotations the groove becomes increasingly inaccurate. In addition the material of the known pitch spindles is substantially never free of shrink holes. It is possible to manufacture pitch spindles from steel with a greater precision. However, the groove of steel spindles is not ideal and the high cost of their production is not justified. In another known device a wire is wound on a pitch spindle of a flexible material; the turns of the wire are embedded in the spindle to clock them in place. However, a guide wire wound on such a spindle cannot be wound so accurately that a sufficiently true pitch can be guaranteed with its use.

The limit of accuracy, which, it seemed, could not be exceeded, can be improved considerably if, according to the invention, a pitch spindle in which a groove is cut, by means of a sharpened, hard cutter, consists of an easily engravable material, as compared with the material of the cutter, of a depth at least equal to the depth of the groove. Suitable spindle material consists of a matrix lacquer or artificial glass of polymeric methacrylic acid ester. Suitable material for the cutter consists, for example, of precious stone such as sapphire or diamond. With the foregoing materials grooves can be cut into the easily engraveable spindle material having a good and even profile and good surface quality. The winding tolerances of frame grids manufactured with pitch spindles according to the invention are considerably overcome with respect to those heretofore known, and the dependency on a high quality wire is largely decreased.

In order to prolong the life of the guide boxes, they may be coated, after the groove is formed, with a silver and chromium film. The thin but hard chromium film made by modern, known techniques does not deteriorate the surface quality of the groove.

In order that the invention may readily be carried into effect, an example thereof will now be described with reference to the accompanying drawings, in which.

Figure 1:
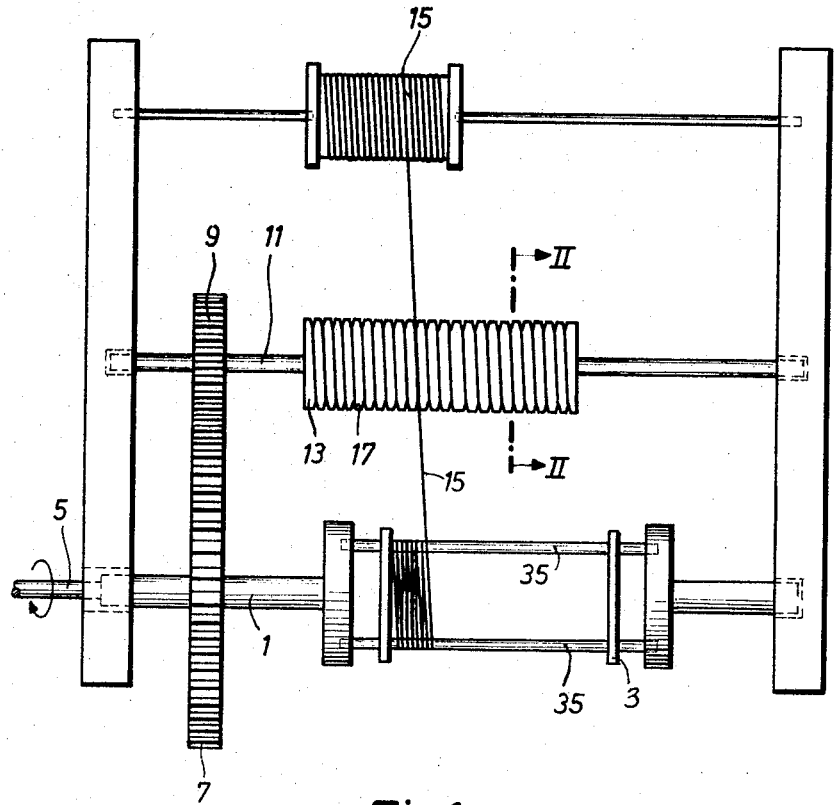
FIG. 1 shows a known winding device for frame grids with a pitch box according to the invention.

In the winding spindle 1 of a grid winding device a frame 3 of a frame grid is clamped. The winding spindle 1 is driven by means of a drive (not shown) through a shaft 5. A toothed wheel 7 is provided on the winding spindle which drives a pitch spindle 13 via a toothed wheel 9 and shaft 11. The grid wire 15, drawn from a supply roller through the helical groove 17 of the guide spindle 13, is wound on the rotating frame grid 3.

Figure 2:
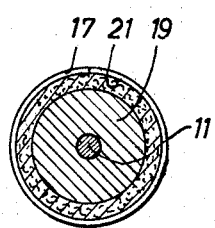
FIGS. 2 and 3 show cross sectional views of embodiments of the pitch box according to the invention.
Figure 3:
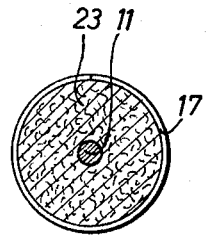

One embodiment of a pitch spindle 13, shown in FIG. 2, consists of a metallic cylinder or sleeve 19 which is coated, in any suitable manner, with a layer 21 of a matrix lacquer. The pitch spindle shown in FIG. 3 consists of a sleeve 23 made of a polymeric methacrylic acid ester material. Both boxes are provided on the pitch shaft 11.

Figure 4:
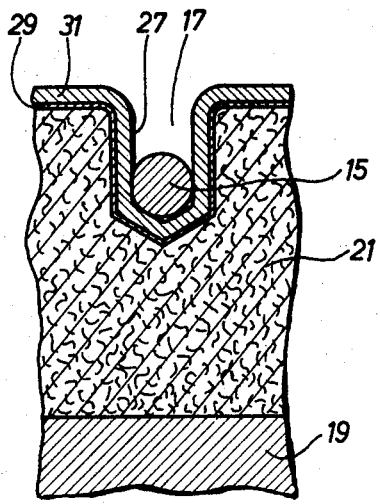
FIGS. 4 and 5 show preferred profiles of the grooves.
Figure 5:
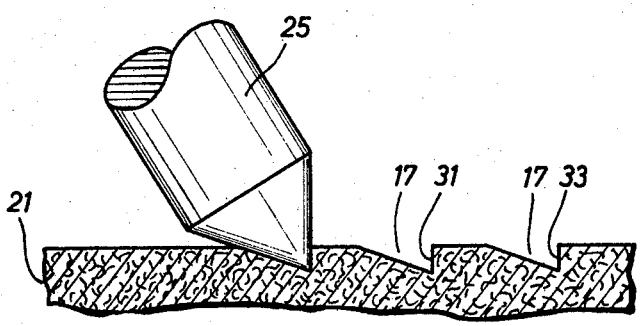

A groove 17 is cut in the engraveable surface layer 21 or 23 of the pitch spindle 13 by means of a diamond or sapphire cutter 25 (FIG. 5). In order to preclude the winding wire 15 from riding on the edges 27 of the groove 17, the cutter 25 cuts the groove 17 in a manner such that, as shown in FIG. 4, the edges 27 of the groove extend substantially parallel to one another and the depth of the groove is more than twice as large as the width of the groove. To prevent detrition of layer 21 or 23, the surface of at least the groove is coated with a silver layer 29 which is 1 to 2 microns thick and is produced by vapour deposition. A chromium layer 31 is provided on this silver layer 29 which is approximately 2 to 4 microns thick and is applied by electro-deposition. If the diameter of the grid wire 15 is approximately 10 microns, a pitch box 13 with a groove 17 is used which has a groove depth of approximately 5 microns, a width of 20 microns and is coated with a surface layer of 4 microns thickness.

A similarly good pitch guide can be obtained by means of a groove 17' shown in FIG. 5. In this case, it should be ensured that the edge 33 of the groove, on which the grid wire bears as a result of the shape of the groove, is cut in a radial plane.

If the pitch spindle consists of said above-mentioned polymeric ester it may be desirable not to metallize its surface. The tungsten wire, which is pulled through the groove of the artificial glass spindle 23, cuts (by virture of its very rough surface) into the groove 17, thereby providing itself with a desired base. If the position of the groove 17 is accurately cut by means of a precious stone cutter 25, the wire 15 cutting itself into the artificial glass material experiences an additional guiding force which renders it difficult for the wire to vary its position between the pitch spindle 13 and the grid frame 3 by itself. In this case also a high quality grid wire 15 is not necessary.

What is claimed is:

1. A pitch spindle for winding apparatus comprising a cylinder having at least a peripheral layer of engraveable material, a helical groove in said layer and a wear surface coating on at least the groove defining portion of said cylinder.

2. The pitch spindle according to claim 1 wherein said engraveable material is selected from the group consisting of matrix lacquer or polymeric methacrylic acid ester.

3. The pitch spindle according to claim 1 wherein said wear-surface-coating consists of a first layer of silver attached to said cylinder and a second layer of chromium attached to silver layer.

4. The pitch spindle according to claim 3 wherein said spindle is adapted to guide a winding wire having a diameter on the order of 10 microns; said groove depth being on the order of 50 microns and having a width on the order of 20 microns, the thickness of both said silver and chromium layers being on the order of 4 microns and the said silver layer being not substantially greater than 2 microns.

References Cited by the Examiner

UNITED STATES PATENTS

| | | | |
|---|---|---|---|
| Re. 19,692 | 9/1935 | Baker | 274—19 |
| 200,521 | 2/1878 | Edison | 274—19 |
| 1,945,935 | 2/1934 | Fischer | 29—90 |
| 2,173,050 | 9/1939 | Woolf | 29—90 |
| 3,081,800 | 3/1963 | Brosby et al. | 140—71.5 |

FOREIGN PATENTS 963,260   5/1957   Germany.

CHARLES W. LANHAM, *Primary Examiner.*

W. H. JUST, *Assistant Examiner.*